United States Patent
Fuchs et al.

(10) Patent No.: US 11,967,844 B2
(45) Date of Patent: Apr. 23, 2024

(54) CHARGER AND CHARGER HOUSING WITH A FASTENING REGION

(71) Applicant: Andreas Stihl AG & Co. KG, Waiblingen (DE)

(72) Inventors: Michael Fuchs, Waiblingen (DE); Charis Hellmann, Korntal-Muenchingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 15 days.

(21) Appl. No.: 17/644,230

(22) Filed: Dec. 14, 2021

(65) Prior Publication Data
US 2022/0190608 A1 Jun. 16, 2022

(30) Foreign Application Priority Data
Dec. 15, 2020 (EP) .................................... 20214320

(51) Int. Cl.
*H02J 7/00* (2006.01)
(52) U.S. Cl.
CPC .......... *H02J 7/0042* (2013.01); *H02J 7/0013* (2013.01)
(58) Field of Classification Search
CPC .................................................. H02J 7/0042
See application file for complete search history.

(56) References Cited

U.S. PATENT DOCUMENTS

| 9,343,916 | B2* | 5/2016 | Emslie | H02J 7/0044 |
| 9,906,055 | B2* | 2/2018 | Taga | H01M 10/46 |
| 2011/0241608 | A1* | 10/2011 | Adamczyk | H02J 7/0013 320/108 |
| 2014/0368163 | A1 | 12/2014 | Ho | |

FOREIGN PATENT DOCUMENTS

| EP | 2 866 324 A1 | 4/2015 |
| GB | 2497372 B | 8/2014 |

OTHER PUBLICATIONS

German-language European Search Report issued in European Application No. 20214320.2 dated May 21, 2021 with partial English translation (nine (9) pages).

* cited by examiner

*Primary Examiner* — Robert Grant
(74) *Attorney, Agent, or Firm* — Crowell & Moring LLP

(57) ABSTRACT

A charger housing has an operating side, at least one battery charging port, which is accessible from the operating side, and a first fastening region, on the outer side of the housing, on a first fastening side which is different from the operating side. The first fastening region is designed for detachably fastening the charger housing to a fastening support and has one or more first fastening elements. The charger housing also has a second fastening region, on the outer side of the housing, on a second fastening side which is different from the operating side and the first fastening side. The second fastening region is designed for detachably fastening the charger housing to a fastening support and has one or more second fastening elements. Use may be as a housing of a charger for recharging battery packs for electric gardening and forestry working apparatus.

18 Claims, 5 Drawing Sheets

CHARGER AND CHARGER HOUSING WITH A FASTENING REGION

CROSS REFERENCE TO RELATED APPLICATION

This application claims priority under 35 U.S.C. § 119 from European Patent Application No. 20214320.2, filed Dec. 15, 2020, the entire disclosure of which is herein expressly incorporated by reference.

BACKGROUND AND SUMMARY OF THE INVENTION

The invention relates to a charger housing which comprises an operating side, at least one battery charging port, which is accessible from the operating side, and a first fastening region, on an outer side of the housing, on a first fastening side which is different from the operating side, wherein the first fastening region is designed for detachably fastening the charger housing to a fastening support and has one or more first fastening elements, and relates to a charger which is equipped with such a charger housing.

Charger housings of this kind are used for chargers, more specifically electrical chargers, which serve to electrically charge, that is to say electrically recharge, a respective rechargeable electric battery unit. For this purpose, the battery unit in question is introduced into the battery charging port from the operating side of the charger housing. Said electric battery unit can then be removed from said battery charging port again on the operating side of the charger housing, in particular after recharging has taken place. The charger can be designed as a single-port charger which has a single battery charging port, or as a multi-port charger which has a plurality of battery charging ports. The term battery unit here comprises an electrical energy store of any conventional type of battery, in particular of the type of what are referred to as battery packs, as are frequently used for supplying electrical power, for example, to electrically operated gardening and forestry work devices and electrically operated DIY (Do-It-Yourself) devices.

By means of its first fastening region, for example a rear-side fastening region or a rear-side fastening area, the charger housing can be detachably fastened to a, for example flat, fastening support, for example to a vertically oriented wall of a building or of a vehicle interior or the like in the case of wall mounting or to a horizontally oriented floor or table area or the like if floor-/table-mounted. In so doing, the first fastening region can be placed against a corresponding region of the fastening support and the detachable fastening is performed by means of the associated fastening element or elements. These fastening elements may be, on the part of the charger housing, for example, screw-fastening openings, hook-and-loop fastener elements, magnetic elements, releasable adhesive connecting elements or other conventional detachable fastening elements.

Patent publication GB 2497372 B discloses a modular charger with a chassis-like, cuboidal or strip-like charger housing of the kind mentioned at the outset which has battery receiving bodies which can be attached in a modular manner to a front side, which acts as an operating side, and each comprise a battery charging port for receiving and charging a suitable battery unit. The rear side of this charger housing is provided with a respective screw opening as a refastening element in its four corner or side regions, as a result of which said charger housing can be fastened to a vertically oriented wall, for example of a mounting frame of a computer structure, by means of associated screws or to a building wall or a similar wall via suitable wall fastening brackets. As an alternative, stand elements can be fitted to the opposite narrow sides of this strip-like charger housing, it being possible for the housing to be set down on a horizontal table surface or the like by way of said stand elements.

It is the technical problem of the invention to provide a charger housing of the kind mentioned at the outset which can be implemented with a comparatively low level of expenditure and is improved in comparison to the above-mentioned prior art, in particular in respect of its fastening options and its resulting variability in use, and a charger which is equipped with said charger housing.

The invention solves this problem by providing an inventive charger housing and a charger having such charger housing. Advantageous developments of the invention which contribute to solving this and further problems are specified in the dependent claims, the content of which is hereby fully included in the content of the description by reference.

The charger housing according to the invention comprises an operating side, at least one battery charging port, which is accessible from the operating side, and a first fastening region, on an outer side of the housing, on a first fastening side which is different from the operating side, wherein the first fastening region is designed for detachably fastening the charger housing to a fastening support and has one or more first fastening elements, and in addition to its first fastening region on the outer side of the housing comprises a second fastening region, on the outer side of the housing, on a second fastening side which is different from the operating side and the first fastening side, wherein the second fastening region is designed for detachably fastening the charger housing to a fastening support and has one or more second fastening elements.

This selectively renders possible for the charger housing according to the invention fastening by means of the first fastening region or fastening by means of the second fastening region to a respective, for example flat, fastening support, such as a vertically oriented wall surface or a horizontally oriented table surface or another type of support which is oriented vertically or horizontally or in any other desired way in space and can be planar, curved and/or profiled, that is to say provided with fastening projections or fastening recesses for example. The respective first or second fastening region can be a single region, that is to say an area in the mathematical sense, with a rather point-like or a rather flat extent or a multiple-part region consisting of all of the plurality of such subregions which are separated from one another. This includes the possibility that the respective fastening region is formed by one or more point-like or flat fastening projections which protrudes or protrude from the rest of the fastening side in question.

As a result, the charger housing according to the invention provides variable detachable fastening options in a flexible manner with a relatively low level of expenditure, this increasing its variability in use and especially its ability to be positioned in a flexible manner for the charging operation of the associated charger. For example, screw-fastening openings, hook-and-loop fastener elements, magnetic elements, releasable adhesive connecting elements or adhesive connecting areas or other conventional detachable fastening elements can be used for the second fastening elements, as for the first fastening elements, on the part of the charger housing. It goes without saying that the associated fastening support has corresponding fastening elements which interact with those of the charger housing in a releasably connecting manner, such as corresponding screw bolts, hook-and-loop fastener elements, magnetic elements or releasable adhesive connecting elements or areas.

The charger according to the invention has a charger housing according to the invention of this kind.

In a development of the invention, the first fastening region comprises a plurality of separate, for example rather flat or alternatively rather point-like, first fastening zones which lie in a common first fastening plane. This is advantageous, for example, for fastening the charger housing to a fastening support which has corresponding fastening zones which likewise lie in a common plane. By means of the first fastening zones which lie in a common plane, the charger housing can be placed against such a fastening support in a corresponding plurality of zones which are spaced apart from one another, so that the charger housing can be held on the respective fastening support with good support. As an alternative, the first fastening region can be formed by a single planar flat region, for example a rear surface, or by a plurality of separate, for example flat or point-like, first fastening zones which lie in two or more different planes.

In a development of the invention, the first fastening region comprises a plurality of separate, for example flat or point-like, fastening zones which each have at least one first screw-fastening opening as a first fastening element. This constitutes a structurally simple implementation which is expedient in respect of fastening stability. In alternative embodiments, the first fastening side can provide, for example, a single planar surface as a first fastening region, and/or other first fastening elements can be used, for example hook-and-loop fasteners or magnetic elements.

In a refinement of the invention, the first fastening side has a polygonal shape, and the first fastening zones are located in corner or side regions of the first fastening side. Therefore, the first fastening zones of the charger housing, in which associated first fastening points are located, are situated relatively far apart, this being beneficial for the stability of the fastening of the charger housing to the fastening support. In alternative embodiments, the first fastening side can be, for example, of circular or oval shape and, in the case of a plurality of separate first fastening zones, these are preferably arranged at relatively large distances from one another.

In a development of the invention, the second fastening region comprises a plurality of separate, for example flat or point-like, second fastening zones which lie in a common second fastening plane. Once again, the charger housing can be placed against an associated fastening support in a corresponding plurality of zones, which are spaced apart from one another, by means of the second fastening zones which lie in a common plane in this case, so that the charger housing can be held on said fastening support with good support. As an alternative, the second fastening region can be formed by a single planar surface, for example a planar side surface, or by a plurality of separate, for example flat or point-like, second fastening zones which lie in two or more different planes.

In a development of the invention, the second fastening region comprises a plurality of separate, for example flat or point-like, fastening zones which each have at least one second screw-fastening opening as a second fastening element. This once again constitutes a structurally simple implementation which is expedient in respect of fastening stability. In alternative embodiments, the housing side in question can provide, for example, a single planar surface as a fastening area, and/or other second fastening elements can be used, for example hook-and-loop fasteners or magnetic elements.

In a refinement of the invention, the second fastening side has a polygonal shape, and the, for example flat or point-like, second fastening zones are located in corner or side regions of the second fastening side. Therefore, the regions of the charger housing, in which regions associated second fastening points are located, are situated relatively far apart, this being beneficial for the stability of this fastening of the charger housing to the fastening support in question. In alternative embodiments, the housing side in question can be, for example, of circular or oval shape and, in the case of a plurality of separate second fastening zones, these are preferably arranged at relatively large distances from one another.

In a development of the invention, the charger housing has outer-side fastening stanchions which each have the first fastening element or elements on a first stanchion side and the second fastening element or elements on a second stanchion side. This constitutes an embodiment of the charger housing which is advantageous in respect of a low level of expenditure on manufacture and good housing stability. The fastening stanchions act as fastening components of the housing and can additionally contribute to housing stability. They can be formed in one piece with the rest of the housing or can be prefabricated separately and mounted on said housing. As an alternative, the charger housing can be fastened to a respective fastening support, for example, directly by means of stanchion-free housing outer wall regions.

In a refinement of the invention, the respective outer-side fastening stanchion has a stanchion base region, which forms the first stanchion side, and a stanchion side region, which forms the second stanchion side. In this case, the charger housing can be selectively secured to a fastening support by means of the stanchion base region of the respective fastening stanchion by way of its first fastening side and to a fastening support by means of the stanchion longitudinal side region of the respective fastening stanchion by way of its second fastening side. In alternative embodiments, the two stanchion sides of the respective fastening stanchion, which have the first fastening element or elements or the second fastening element or elements, can be formed, for example, by two adjoining stanchion longitudinal side regions.

In a refinement of the invention, the respective outer-side fastening stanchion has at least two first fastening elements, which are spaced apart from one another, on the first stanchion side and/or at least two second fastening elements, which are spaced apart from one another, on the second stanchion side. This renders possible in each case stable multi-point fastening of the charger housing to the fastening support by means of the fastening stanchions. As an alternative, the respective fastening stanchion has, for example, only one single first or second fastening element on its stanchion side in question.

In a further refinement of the invention, the second fastening zone of the respective fastening stanchion has at least two second fastening elements which are arranged in a manner spaced apart from one another. This contributes to good stability and strength of this fastening of the charger housing to a fastening support in question.

In a development of the invention, the charger housing forms a housing cuboid, and the operating side is formed by a cuboid main side, that is to say a cuboid side of largest surface extent, or a cuboid longitudinal side, that is to say a cuboid side between the two cuboid main sides, of the housing cuboid. This constitutes a shape and operating functionality for the charger housing which are expedient for a large number of applications. As an alternative, the charger housing has a different geometrical outer contour, for example a shape which is triangular in cross section or a pyramidal shape.

In a refinement of the invention, the outer-side fastening stanchions are arranged on cuboid side edges of the housing cuboid. This contributes to optimizing the selective fixing of the cuboidal charger housing to the respective support on the first or the second fastening side when these two fastening sides adjoin one another at the cuboid side edges in question. As an alternative, the outer-side fastening stanchions can be arranged, for example, in central regions of corresponding cuboid sides of the charger housing.

Advantageous embodiments of the invention are illustrated in the drawings. These and further embodiments of the invention will be explained in more detail below.

DETAILED DESCRIPTION OF THE DRAWINGS

Figure 1:
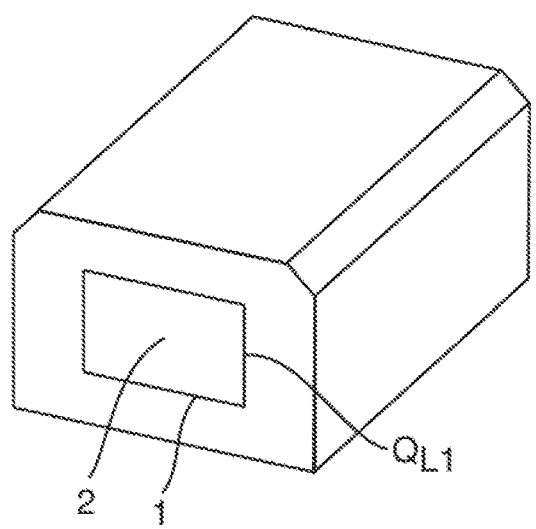
FIG. 1 shows a perspective view obliquely from the front and top of a charger having a charger housing with a front-side operating side.
Figure 2:
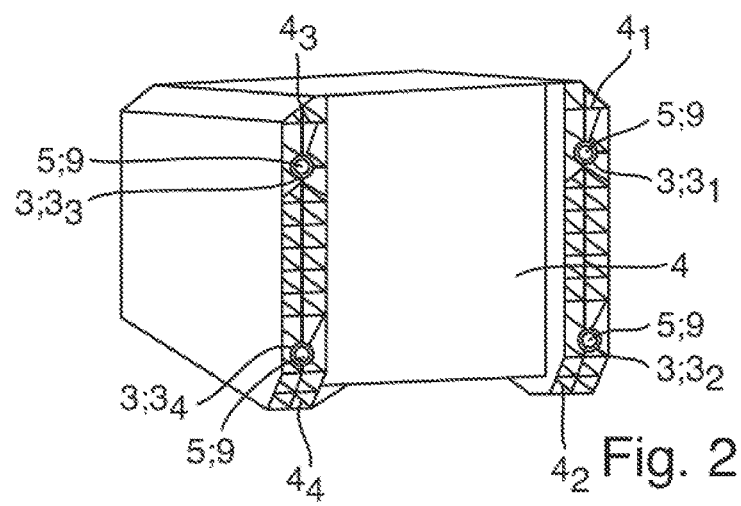
FIG. 2 shows a perspective view of the charger obliquely from the side and rear.
Figure 3:
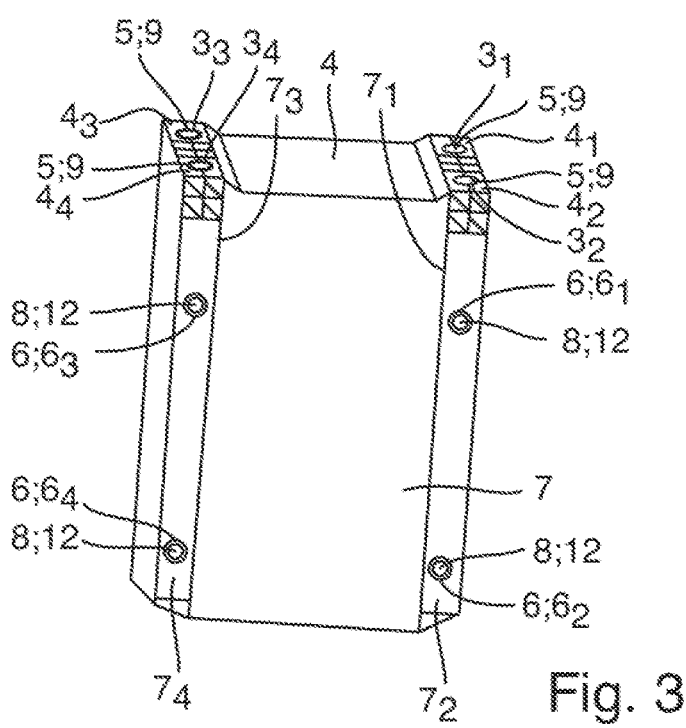
FIG. 3 shows a perspective view of the charger obliquely from the side and bottom.
Figure 4:
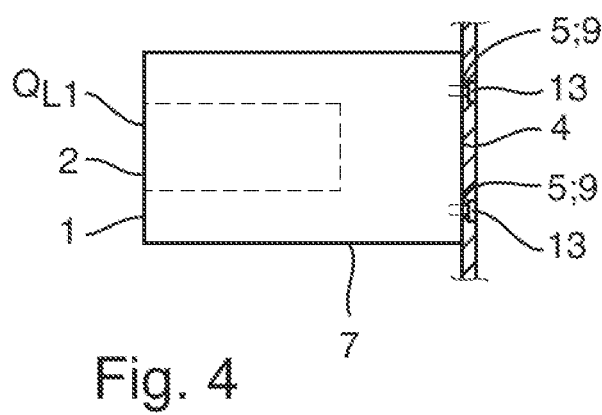
FIG. 4 shows a schematic side view of the charger with the housing fixed to a vertical support at the rear side.
Figure 5:
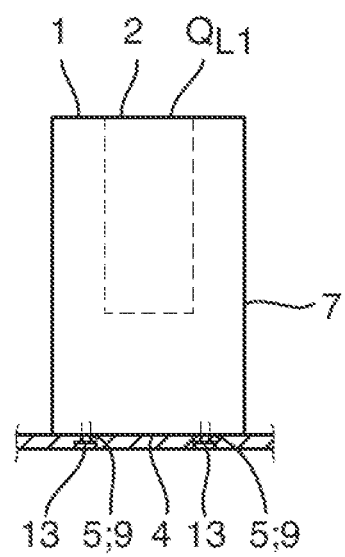
FIG. 5 shows a schematic side view of the charger with the housing fixed to a horizontal support at the rear side.
Figure 6:
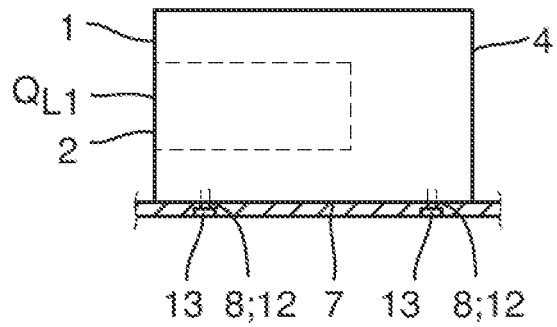
FIG. 6 shows a schematic side view of the charger with the housing fixed to a horizontal support at the bottom side.
Figure 7:
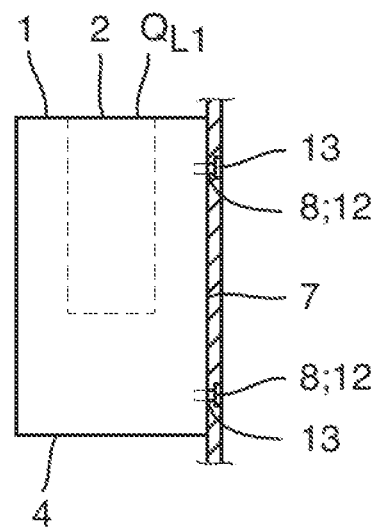
FIG. 7 shows a schematic side view of the charger with the housing fixed to a vertical support at the bottom side.
Figure 8:
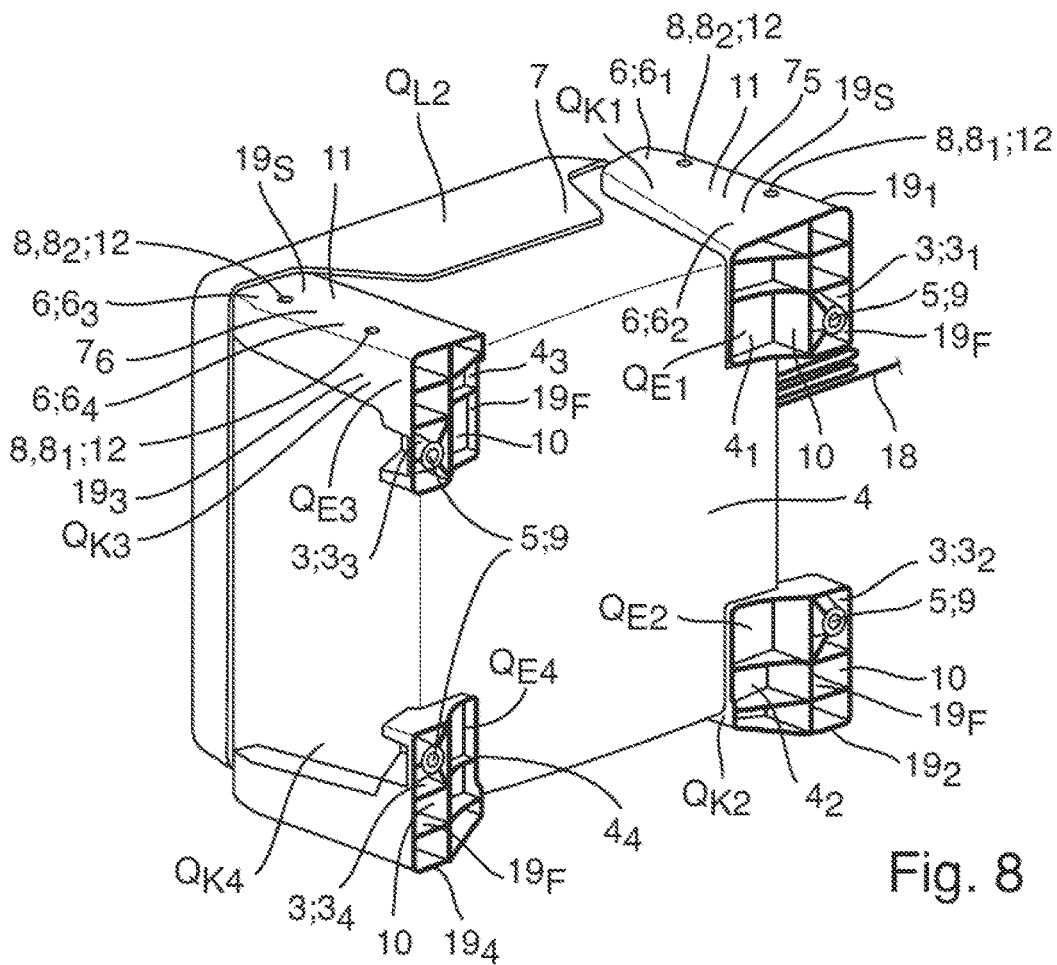
FIG. 8 shows a perspective view obliquely from the side and rear of another charger with a charger housing with a top-side operating side.

The charger according to the invention, as is shown in two exemplary implementations, serves for electrically charging a rechargeable battery unit in a manner which is known per se, wherein the battery unit may be, in particular, a battery pack for supplying electrical power to an electrically operated gardening and forestry work device or an electrically operated DIY device.

The charger comprises a charger housing with an operating side 1 and at least one battery charging port 2 which is accessible from the operating side 1. In the example of FIGS. 8 to 13, the charger housing has four battery charging ports 2, in each of which a rechargeable battery pack 16 can be received for electrical charging by the charger. The charger can be connected to an electrical power supply via a power cable 18. In the example of FIGS. 1 to 7, the charger housing has just one single battery charging port 2, in which a single rechargeable battery pack 16 can be received for electrical charging by the charger. In the text which follows, the operating side 1 is also referred to as the front side or top side of the charger housing and correspondingly the opposite side of the charger housing is referred to as the rear side or bottom side, without loss of generality.

The charger housing comprises a first fastening region 3, on the outer side of the housing, on a first fastening side 4 which is different from the operating side 1, wherein the first fastening region 3 is designed for detachably fastening the charger housing to a fastening support and has one or more first fastening elements 5. Furthermore, the charger housing comprises a second fastening region 6, on the outer side of the housing, on a second fastening side 7 which is different from the operating side 1 and the first fastening side 4, wherein the second fastening region 6 is likewise designed for detachably fastening the charger housing to a fastening support and has one or more second fastening elements 8. In the two housing configurations shown according to FIGS. 1 to 7 and, respectively, FIGS. 8 to 13, the first fastening side 4 is a housing side which is opposite the operating side 1, and the second fastening side 7 is a housing side which runs between the operating side 1 and the first fastening side 4. In other embodiments, the reverse may be true, or the two fastening sides 4, 7 are housing sides which run between the operating side 1 and the side which is opposite said operating side.

On account of these properties, the charger housing can be fastened in a highly variable manner either on its first fastening side 4 or on its second fastening side 7 to a support which is oriented in any desired manner in space. Specifically, the exemplary embodiment of FIGS. 4 to 7 illustrates the selective fastening of the charger by way of its charger housing to a vertical support $20v$ at the rear side, that is to say by way of its rear side, see FIG. 4, or to a horizontal support $20_H$ at the rear side, see FIG. 5, or to the horizontal support $20_H$ at the side, that is to say by way of a housing side which is adjacent to the front side or operating side 1, see FIG. 6, or to the vertical support $20v$ at the side, wherein the front-side operating side 1 faces forwards in the fastening positions of the housing according to FIGS. 4 and 6 and faces upwards in the fastening positions of the housing according to FIGS. 5 and 7. In each of these fastening positions of the charger housing, the operating side 1 is readily accessible to the user for inserting a battery pack 16 to be recharged into the battery charging port 2 and for removing the battery pack 16 from said battery charging port after the recharging process is complete.

Figure 9:
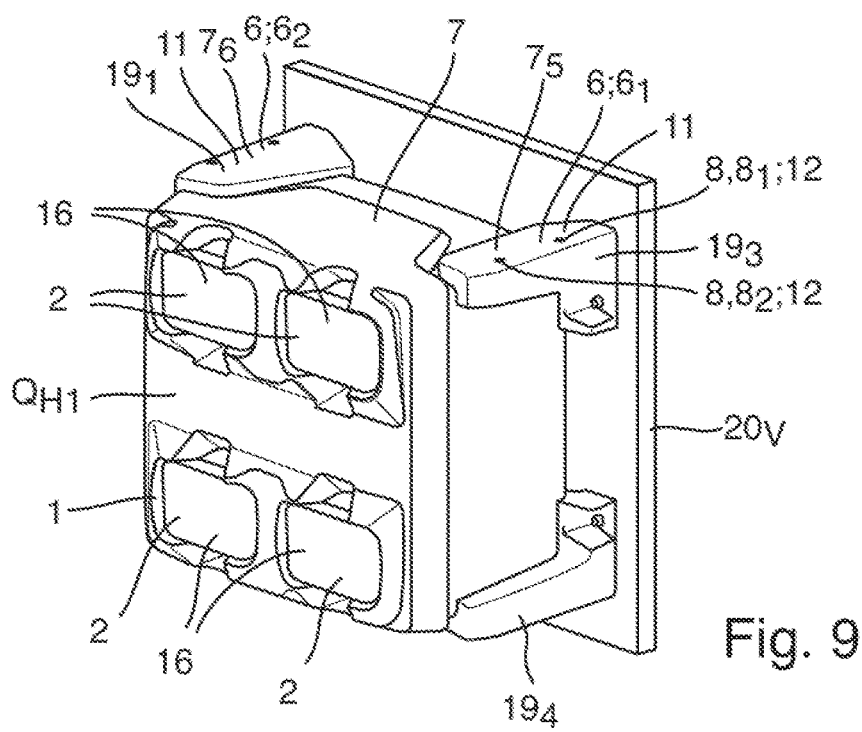
FIG. 9 shows a perspective view obliquely from the front and top of the charger of FIG. 8 with the housing fixed to a vertical support at the rear side.
Figure 10:
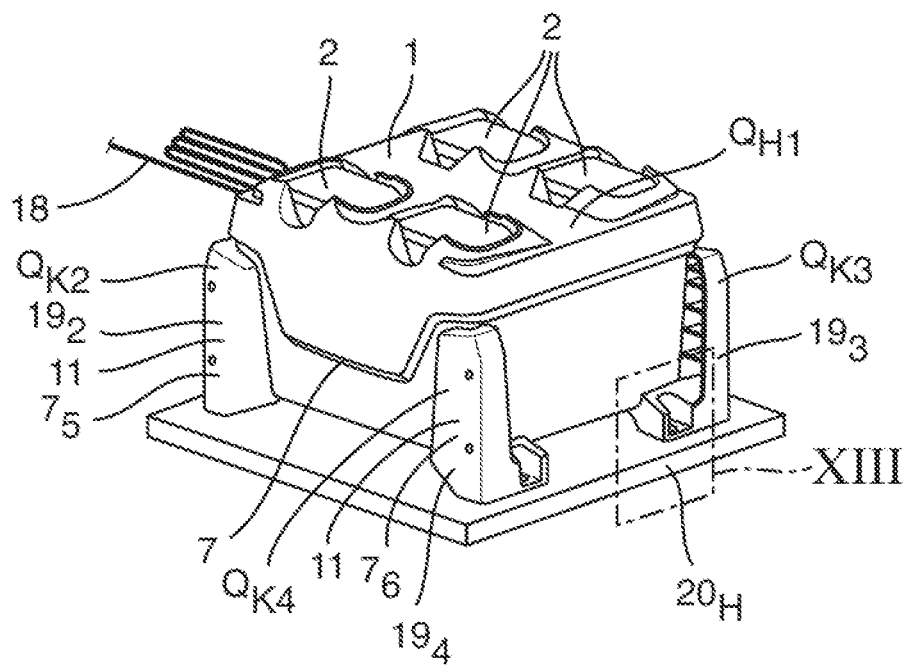
FIG. 10 shows a perspective view obliquely from the front and top of the charger of FIG. 8 with the housing fixed to a horizontal support at the rear side.
Figure 11:
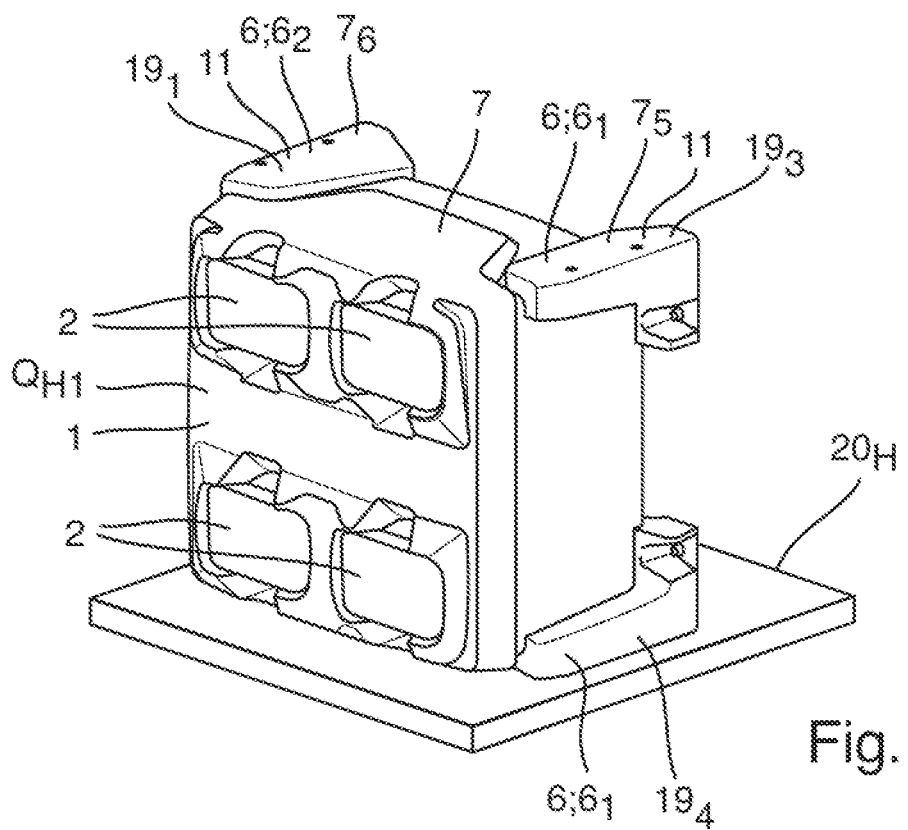
FIG. 11 shows a perspective view obliquely from the front and top of the charger of FIG. 8 with the housing fixed to a horizontal support at the side.
Figure 12:
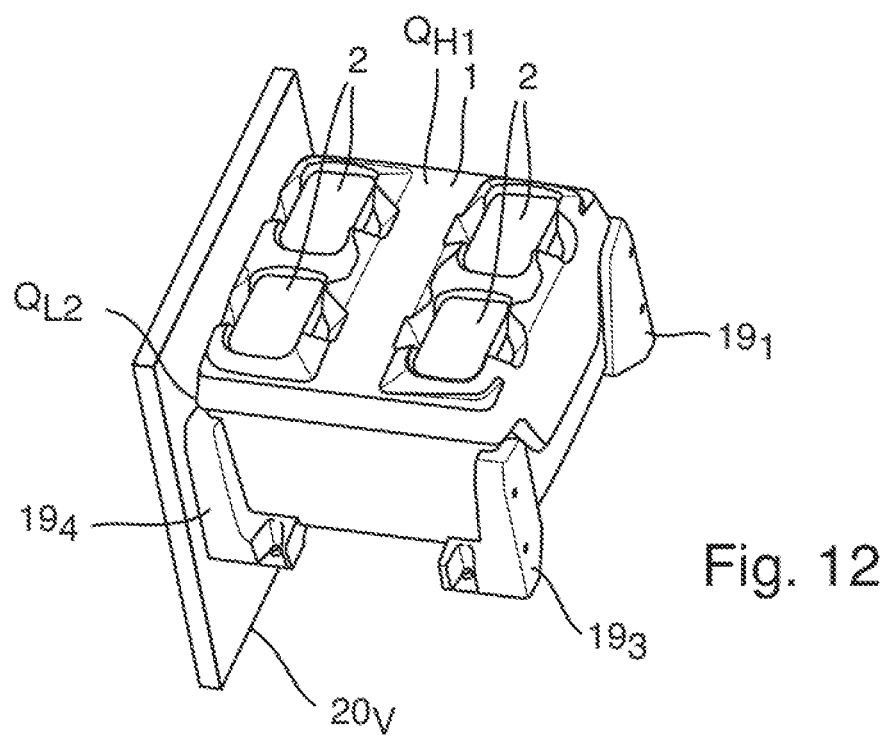
FIG. 12 shows a perspective view obliquely from the front and top of the charger of FIG. 8 with the housing fixed to a vertical support at the side.
Figure 13:
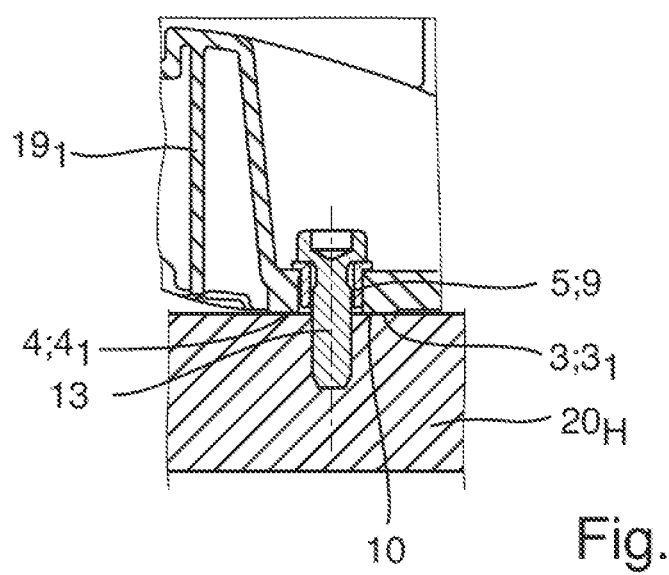
FIG. 13 shows a sectional view of a detail of a region XIII of FIG. 10.

The same applies to the embodiment of the charger housing according to FIGS. 8 to 13. FIG. 9 illustrates the fastening of this charger by way of its charger housing to the support $20_V$, which is once again vertically oriented here, by means of its bottom side or rear side as a first fastening side 4. FIG. 10 illustrates the rear-side fastening of the charger housing to the support $20_H$ which is once again horizontal here. FIG. 11 illustrates side fastening of the charger housing to the horizontal support $20_H$, and FIG. 12 illustrates side fastening of the charger housing to the vertical support $20_V$. In the fastening positions of FIGS. 9 and 11, the charger housing faces forwards by way of its operating side 1, and faces upwards by way of its fastening side 1 in the fastening positions of FIGS. 10 and 12. In this case too, the operating side 1 is readily accessible to the user without problems for inserting and removing the battery pack 16 into and, respectively, from the battery charging ports 2 in each of these fastening positions.

Since the fastening of the charger housing is of detachable design both on its first fastening side 4 and also on its second fastening side 7, the charger housing can be respectively removed from a fastening support again and re-fastened to the same support with a different orientation or to a different support with the same or a different orientation, as a result of which the charger can be positioned in a highly flexible manner and held securely on a respective support for operation.

In corresponding embodiments, the first fastening region 3 comprises a plurality of separate first fastening zones which lie in a common first fastening plane, in the examples shown four separate first fastening zones $3_1$, $3_2$, $3_3$, $3_4$, and in alternative implementations only two or three or more than four fastening zones. The fastening zones $3_1$ to $3_4$ can be of a rather point-like or a rather flat type depending on requirements. Since they lie in a common plane, they are particularly well suited to fastening the charger housing to a correspondingly planar support.

In corresponding embodiments, the first fastening region 3 comprises a plurality of separate first fastening zones which each have at least one first screw-fastening opening 9 as a first fastening element 5, as is the case in the examples shown for the first fastening zones $3_1$ to $3_4$. In particular, a respective screw bolt 13 can interact with the first screw-fastening opening 9, as can be seen, for example, in FIGS. 4, 5 and 13, in order to detachably secure the charger housing in the first fastening zone $3_1$ to $3_4$ in question to the associated support by means of a corresponding screw connection. In alternative implementations, for example, a magnetic element or a hook-and-loop fastener element can be provided as a first fastening element 5 in the respective first fastening zone $3_1$ to $3_4$.

In corresponding embodiments, the first fastening side 4 has a polygonal shape, and the first fastening zones are located in corner or side regions of the first fastening side 4. In the examples shown, the first fastening side 4 has a quadrangular, especially rectangular, shape, and the first fastening zones $3_1$ to $3_4$ are located in corner or side regions $4_1$, $4_2$, $4_3$, $4_4$ of this rectangular first fastening side 4. As a result, the first fastening zones $3_1$ to $3_4$ are arranged in a manner distributed over the first fastening side 4 at relatively large distances from one another, this enhancing the stability of the fastening of the charger housing to the support.

In corresponding implementations, the second fastening region 6 comprises a plurality of separate second fastening zones which lie in a common second fastening plane. In the examples shown, the second fastening region 6 comprises four separate second fastening zones $6_1$, $6_2$, $6_3$, $6_4$. Since these lie in the common second fastening plane, it is once again possible to fasten the charger housing to a planar support by means of its second fastening side 7 without problems. In alternative embodiments, the second fastening region 6 comprises two, three or more than four second fastening zones. The fastening zones $6_1$ to $6_4$ can in turn each be of a rather point-like or a rather flat shape, depending on requirements.

In corresponding embodiments, the second fastening region 6 comprises a plurality of separate second fastening zones which each have at least one second screw-fastening opening 12 as a second fastening element 8, as is the case in the examples shown for the respectively four second fastening zones $6_1$ to $6_4$. Once again, for example, a respective screw bolt 13 can interact with the screw-fastening opening 12, as can be seen, for example, in FIGS. 6 and 7, in order to fasten the charger housing in the second fastening zone $6_1$ to $6_4$ in question by way of its second fastening side 7 to a support by means of a releasable screw connection. In alternative implementations, for example, a magnetic element or a hook-and-loop fastener element is provided as a second fastening element 8.

In corresponding embodiments, the second fastening side 7 has a polygonal shape, in the examples shown especially a quadrangular or rectangular shape, and the second fastening zones $6_1$ to $6_4$ are located in corner or side regions of the second fastening side 7, in the example of FIGS. 1 to 7 in four corner regions $7_1$, $7_2$, $7_3$, $7_4$, and in the example of FIGS. 8 to 13 in two side regions $7_5$, $7_6$. In this way, stable fastening of the charger housing by way of its second fastening side 7 to a support as corresponding multi-point fastening at fastening sites which are relatively far away from one another can be achieved.

In advantageous embodiments, the charger housing comprises, as in the exemplary embodiment of FIGS. 8 to 13, outer-side fastening stanchions $19_1$, $19_2$, $19_3$, $19_4$ which each have the first fastening element or elements 5 on a first stanchion side 10 and the second fastening element or elements 8 on a second stanchion side 11. As a result, the fastening stanchions $19_1$ to $19_4$ take on the fastening function for the charger housing and can be specially designed for this purpose, so that the design of the charger housing can moreover be kept independent of this fastening function. The fastening stanchions $19_1$, $19_2$, $19_3$, $19_4$ can be in one piece or, as in the example shown, can be prefabricated separately from the rest of the housing and connected to said housing in a releasable or non-releasable manner, that is to say in a manner such that they cannot be released without being destroyed.

In advantageous embodiments, the respective outer-side fastening stanchion $19_1$ to $19_4$ has, as in the example shown in FIGS. 8 to 13, a stanchion base region $19_F$, which forms the first stanchion side 10, and a stanchion longitudinal side region $19_S$, which forms the second stanchion side 11. This constitutes a functionally expedient implementation of the fastening stanchions $19_1$ to $19_4$. The charger housing can therefore be selectively detachably fixed to a respective support by means of the four base regions $19_F$ of the fastening stanchions $19_1$ to $19_4$ by way of its first fastening side 4 or by means of the longitudinal side regions $19_S$ of two of the fastening stanchions $19_1$ to $19_4$ by way of its second fastening side 7, wherein in this case the two fastening sides 4, 7 are two adjoining or adjacent housing sides since the stanchion base region $19_F$ and the stanchion longitudinal side region 19s of the fastening stanchions $19_1$ to $19_4$ are typically correspondingly adjacent or adjoining surface regions of the fastening stanchions $19_1$ to $19_4$. In this case, the fastening stanchions $19_1$ to $19_4$ have in each case two of the fastening zones $6_1$ to $6_4$ in their stanchion longitudinal side region $19_S$. If required, the charger housing can also be selectively fastened to a support by way these fastening stanchions $19_1$ to $19_4$ on one of its housing longitudinal sides other than a third fastening side between its operating side 1 and its first fastening side 3.

In corresponding embodiments, the respective outer-side fastening stanchion $19_1$ to $19_4$ has at least two first fastening elements, which are spaced apart from one another, on its first stanchion side 10 and/or at least two second fastening elements, which are spaced apart from one another, on its second stanchion side 11. In the example shown in FIGS. 8 to 13, each fastening stanchion $19_1$ to $19_4$ comprises a plurality of, for example two, first fastening elements $5_1$, $5_2$ and second fastening elements $8_1$, $8_2$ on its first stanchion side 10 and, respectively, on its second stanchion side 11. In alternative implementations, more than two first fastening elements and/or more than two second fastening elements are located on the first and, respectively, the second stanchion side 10, 11.

In advantageous embodiments, the charger housing forms, as in the examples shown, a housing cuboid, and the operating side 1 is formed by a cuboid main side $Q_{H1}$, as in the example of FIGS. 8 to 13, or by a cuboid longitudinal side $Q_{L1}$ of the housing cuboid, as in the example of FIGS. 1 to 7. This cuboidal shape of the charger housing is optimal for a large number of charger applications, both in respect of the positioning of battery units to be recharged and also in respect of the variable detachable fastening of the charger housing to any desired supports with any desired spatial orientation of the respective fastening support and therefore of the charger housing which is detachably fixed to it.

In advantageous implementations, in the case of a charger housing formed with such a cuboidal shape and with outer-side fastening stanchions, as in the exemplary embodiment of FIGS. 8 to 13, the outer-side fastening stanchions $19_1$ to $19_4$ are arranged on cuboid side edges $Q_{K1}$, $Q_{K2}$, $Q_{K3}$, $Q_{K4}$ and/or in cuboid corner regions $Q_{E1}$, $Q_{E2}$, $Q_{E3}$, $Q_{E4}$ of the housing cuboid. In the example shown in FIGS. 8 to 13, the fastening stanchions $19_1$ to $19_4$ in particular each extend both along a cuboid side edge $Q_{K1}$ to $Q_{K4}$ and also in an adjoining cuboid corner region $Q_{E1}$ to $Q_{E4}$. Therefore, in this implementation, the charger housing can be selectively detachably secured to a support oriented as desired horizontally, vertically or in some other way in space by way of its rear or bottom side as the first fastening side 4 by means of the stanchion base regions $19_F$ of the fastening stanchions $19_1$ to $19_4$ or by way of a cuboid longitudinal side $Q_{L2}$ as its second fastening side 7 by means of the stanchion longitudinal side regions $19_S$ of the fastening stanchions $19_1$ to $19_4$, depending on requirements.

In alternative embodiments, the charger housing does not have a cuboidal shape, but rather, for example, a pyramidal shape or some other polyhedral shape or a housing shape in which one or more housing sides run in a convex or curved manner, for example in the form of a spherical shell.

In corresponding implementations, the outer-side fastening stanchions protrude to the rear beyond the rest of the intermediate housing wall region of the rear side of the charger housing outside the fastening stanchions and/or outwards to the side beyond the rest of the intermediate housing wall region of the housing side in question. In the example shown, the outer-side fastening stanchions $19_1$, $19_2$, $19_3$, $19_4$ protrude both to the rear and also outwards to the side. The excess length of the fastening stanchions to the rear has the effect that the charger housing, when it is mounted by way of the rear side, is not placed against a support by way of the entire surface area of its rear wall, but rather a gap remains therebetween. The excess length of the fastening stanchions to the side similarly has the effect that the charger housing, when it is mounted at the side, is not placed against the support by way of the entire surface area of its housing side in question, but rather a gap remains therebetween. As a result, in a case in which a plurality of identical chargers together with their housings are intended to be arranged next to one another in a row or in a two-dimensional field or array, they can also be positioned such that in each case two adjacent charger housings bear against one another by way of their mutually facing fastening stanchions, while a gap remains between the mutually facing housing wall regions outside the fastening stanchions. In other words, the fastening stanchions, owing to their excess length on the rear side or at the side, can act as spacers for mounting the respective charger housing on a support and/or as spacers for positioning a plurality of charger housings next to one another at small distances.

As the exemplary embodiments shown and the further exemplary embodiments explained above make clear, the invention provides a charger and a related charger housing with a very advantageous configuration in respect of handling, flexibility of use, functionality and variable fastening options. The charger can be used, in particular, for electrically recharging battery packs and similar rechargeable battery units for hand-held gardening and forestry work devices and other electrically operated handheld power tools.

What is claimed is:

1. A charger housing, comprising:
an operating side;
at least one battery charging port, which is accessible from the operating side;
a first fastening region, on the outer side of the housing, on a first fastening side which is different from the operating side, wherein the first fastening region is designed for detachably fastening the charger housing to a fastening support and has one or more first fastening elements; and
a second fastening region, on the outer side of the housing, on a second fastening side which is different from the operating side and the first fastening side, wherein the second fastening region is designed for detachably fastening the charger housing to a fastening support and has one or more second fastening elements,
wherein the first fastening side or the second fastening side is a housing side which is opposite the operating side,
wherein the fastening support upon which the first or second fastening regions are configured to be detachably fastened to is not another charger housing.

2. The charger housing according to claim 1, wherein the first fastening region comprises a plurality of separate first fastening zones which lie in a common first fastening plane.

3. The charger housing according to claim 1, wherein the first fastening region comprises a plurality of separate first fastening zones each having at least one first screw-fastening opening as a first fastening element.

4. The charger housing according to claim 2, wherein the first fastening side has a polygonal shape and the first fastening zones are located in corner or side regions of the first fastening side.

5. The charger housing according to claim 3, wherein the first fastening side has a polygonal shape and the first fastening zones are located in corner or side regions of the first fastening side.

6. The charger housing according to claim 1, wherein the second fastening region comprises a plurality of separate second fastening zones which lie in a common second fastening plane.

7. The charger housing according to claim 1, wherein the second fastening region comprises a plurality of separate second fastening zones each having at least one second screw-fastening opening as a second fastening element.

8. The charger housing according to claim 6, wherein the second fastening side has a polygonal shape and the second fastening zones are located in corner or side regions of the second fastening side.

9. The charger housing according to claim 7, wherein the second fastening side has a polygonal shape and the second fastening zones are located in corner or side regions of the second fastening side.

10. A charger housing, comprising:
an operating side;
at least one battery charging port, which is accessible from the operating side;
a first fastening region, on the outer side of the housing, on a first fastening side which is different from the operating side, wherein the first fastening region is designed for detachably fastening the charger housing to a fastening support and has one or more first fastening elements;
a second fastening region, on the outer side of the housing, on a second fastening side which is different from the operating side and the first fastening side, wherein the second fastening region is designed for detachably fastening the charger housing to a fastening support and has one or more second fastening elements; and
outer-side fastening stanchions which each comprise the first fastening element or elements on a first stanchion side and the second fastening element or elements on a second stanchion side.

11. The charger housing according to claim 10, wherein the respective outer-side fastening stanchion comprises a stanchion base region which forms the first stanchion side, and a stanchion longitudinal side region which forms the second stanchion side.

12. The charger housing according to claim 10, wherein the respective outer-side fastening stanchion comprises at least two first fastening elements, which are spaced apart from one another, on the first stanchion side.

13. The charger housing according to claim 10, wherein the respective outer-side fastening stanchion comprises at least two second fastening elements, which are spaced apart from one another, on the second stanchion side.

14. The charger housing according to claim 1, wherein the charger housing forms a housing cuboid and the operating side is formed by a cuboid main side or a cuboid longitudinal side of the housing cuboid.

15. The charger housing according to claim 10, wherein the charger housing forms a housing cuboid and the operating side is formed by a cuboid main side or a cuboid longitudinal side of the housing cuboid.

16. The charger housing according to claim 15, wherein the outer-side fastening stanchions are arranged on cuboid side edges of the housing cuboid.

17. The charger housing according to claim 15, wherein the outer-side fastening stanchions are arranged in cuboid corner regions of the housing cuboid.

18. A charger for electrically charging a rechargeable battery unit, comprising:
a charger housing, said charger housing comprising
an operating side;
at least one battery charging port, which is accessible from the operating side;
a first fastening region, on the outer side of the housing, on a first fastening side which is different from the operating side, wherein the first fastening region is designed for detachably fastening the charger housing to a fastening support and has one or more first fastening elements;
a second fastening region, on the outer side of the housing, on a second fastening side which is different from the operating side and the first fastening side, wherein the second fastening region is designed for detachably fastening the charger housing to a fastening support and has one or more second fastening elements,
wherein the fastening support upon which the first or second fastening regions are configured to be detachably fastened to is not another charger housing, and
wherein at least one of:
(i) the first fastening side or the second fastening side is a housing side which is opposite the operating side, or
(ii) the charger housing further comprises outer-side fastening stanchions which each comprise the first fastening element or elements on a first stanchion side and the second fastening element or elements on a second stanchion side.

\* \* \* \* \*